United States Patent
Lyle et al.

(10) Patent No.: US 12,008,119 B1
(45) Date of Patent: Jun. 11, 2024

(54) INTELLIGENT VOICE ASSISTANT PRIVACY REGULATING SYSTEM

(71) Applicant: UIPCO, LLC, San Antonio, TX (US)

(72) Inventors: Ruthie D. Lyle, Durham, NC (US); Bharat Prasad, San Antonio, TX (US); Ravi Durairaj, San Antonio, TX (US); Nolan Serrao, Plano, TX (US); Minya Liang, Redmond, WA (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 16/941,063

(22) Filed: Jul. 28, 2020

Related U.S. Application Data

(60) Provisional application No. 62/881,244, filed on Jul. 31, 2019.

(51) Int. Cl.
| | |
|---|---|
| G06F 21/60 | (2013.01) |
| G06F 3/16 | (2006.01) |
| G06F 21/32 | (2013.01) |
| H04L 9/40 | (2022.01) |
| H04W 12/02 | (2009.01) |
| H04W 12/30 | (2021.01) |

(52) U.S. Cl.
CPC ........... *G06F 21/606* (2013.01); *G06F 3/16* (2013.01); *G06F 21/32* (2013.01); *H04L 63/20* (2013.01); *H04W 12/02* (2013.01); *H04W 12/30* (2021.01)

(58) Field of Classification Search
CPC .......... G06F 21/606; G06F 3/16; G06F 21/32; H04L 63/20; H04W 12/02; H04W 12/30
See application file for complete search history.

(56) References Cited

U.S. PATENT DOCUMENTS

| | | | |
|---|---|---|---|
| 10,521,185 B1* | 12/2019 | Kim | H04R 3/00 |
| 2005/0015644 A1* | 1/2005 | Chu | H04L 41/069 |
| | | | 714/4.1 |
| 2018/0233142 A1* | 8/2018 | Koishida | A61B 5/0507 |
| 2019/0074002 A1* | 3/2019 | Christopher | G10L 17/24 |
| 2019/0310820 A1* | 10/2019 | Bates | G06F 9/44505 |

* cited by examiner

*Primary Examiner* — William J. Goodchild
(74) *Attorney, Agent, or Firm* — Plumsea Law Group, LLC

(57) ABSTRACT

An intelligent voice assistant privacy regulating system may include a controller including: a device processor; and a non-transitory computer readable medium including instructions executable by the device processor to perform the following steps: receiving a selection from a user as to one or more privacy settings limiting the transmission of data from an intelligent voice assistant; and regulating transmissions from the intelligent voice assistant based on the selection.

17 Claims, 4 Drawing Sheets

INTELLIGENT VOICE ASSISTANT PRIVACY REGULATING SYSTEM

CROSS-REFERENCE TO RELATED APPLICATIONS

This application claims priority to Lyle et al., U.S. Provisional Application No. 62/881,244, filed Jul. 31, 2019, and titled "Intelligent Voice Assistant Privacy Regulating System," the entire disclosure of which is incorporated herein by reference.

TECHNICAL FIELD

The present disclosure generally relates to regulating privacy of an intelligent voice assistant and, more particularly, to systems and methods for regulating the transmission of data from an intelligent voice assistant based on one or more parameters.

BACKGROUND

Intelligent voice assistants have become a common convenience in many households. Such devices "listen" for speech prompts from users in proximity to the device, and respond with information in reply to the prompts. For example, when a user asks the assistant to play a song that has a particular lyric in it, the assistant finds the song in a database and plays the song for the user. Similarly, if a user asks the assistant how far away the moon is from the earth, the assistant looks up the relevant information in a database and responds by stating the distance between the moon and the earth. This process necessarily involves the transmission of the user's speech input outside their household to a processing center from which the assistant retrieves the responsive information. However, there may be speech that the user does not wish to be "heard" and transmitted outside their household. Moreover, the user may not wish certain speech to be not only transmitted, but stored indefinitely.

There is a need in the art for a system and method that addresses the shortcomings discussed above.

SUMMARY

In one aspect, the present disclosure is directed to an intelligent voice assistant privacy regulating system. The device may include a controller including: a device processor; and a non-transitory computer readable medium including instructions executable by the device processor to perform the following steps: receiving a selection from a user as to one or more privacy settings limiting the transmission of data from an intelligent voice assistant; and regulating transmissions from the intelligent voice assistant based on the selection.

In another aspect, the present disclosure is directed to an intelligent voice assistant privacy regulating system. The system may include a controller including: a device processor; and a non-transitory computer readable medium including instructions executable by the device processor to perform the following steps: receiving a selection from a user as to one or more privacy settings limiting the transmission of data from an intelligent voice assistant; regulating transmissions from the intelligent voice assistant based on the selection; and selectively transmitting data from the intelligent voice assistant.

In another aspect, the present disclosure is directed to a method of regulating privacy of an intelligent voice assistant. The method may include using a device processor to execute instructions stored on a non-transitory computer readable medium to perform the following steps: receiving a selection from a user as to one or more privacy settings limiting the transmission of data from an intelligent voice assistant; and regulating transmissions from the intelligent voice assistant based on the selection.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF EMBODIMENTS

Figure 1:
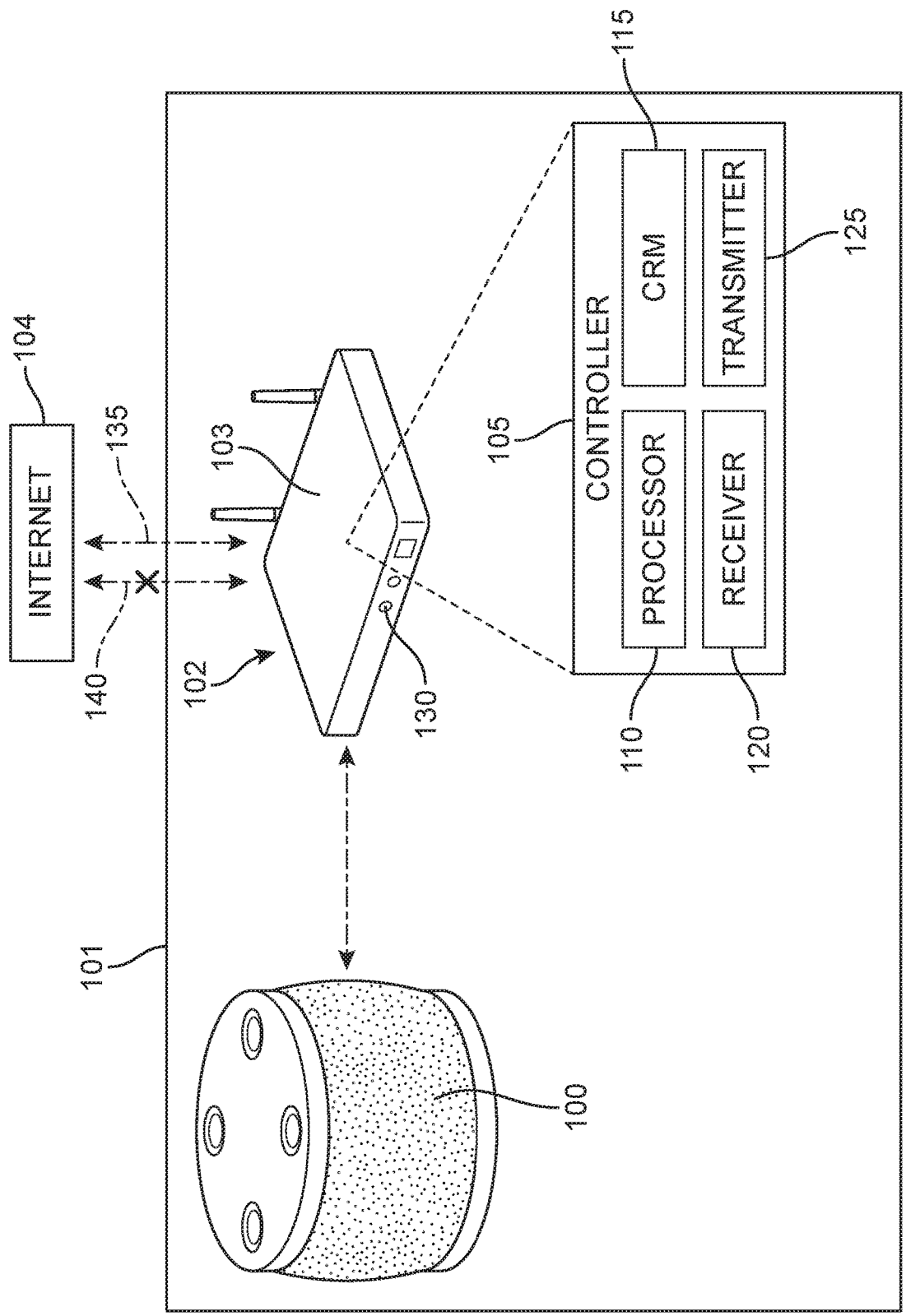
FIG. 1 is a schematic view of an intelligent voice assistant privacy regulating system according to an exemplary embodiment.

FIG. 1 is a schematic view of an intelligent voice assistant privacy regulating system according to an exemplary embodiment. FIG. 1 shows an intelligent voice assistant 100. As used herein, the term "intelligent voice assistant" refers to an artificially intelligent assistant, also called a virtual assistant, that can speak to a user and understand a user's spoken words. Voice assistants, along with chat bots, may be more generally referred to as conversational interfaces (or CUIs), whose purposes are to mimic conversations with a real human. Intelligent voice assistant 100 may be configured with at least one processor, storage (computer memory), one or more speakers and one or more microphones. The speakers may be used to produce audible information (that is, words and other sounds). The microphones may receive audible information (that is, words and other sounds). Optionally, intelligent voice assistant 100 could include a display.

Intelligent voice assistant 100 may also include components to facilitate communication with external systems (for example, hardware and software components to enable communication over a household network). Optionally, intelligent voice assistant 100 could include other input devices such as buttons, a keyboard, a touch screen or other suitable input devices.

Intelligent voice assistant 100 may include one or more software and/or hardware modules that facilitate various kinds of interactions with a user within a household 101, including some of the interactions described above. (It will be noted that the tern household is utilized to refer generally to the environment in which the intelligent voice assistant is used. While such intelligent voice assistants may be most often used in a private dwelling, in some cases they may be used in a workplace, recreation center, or other premises. Accordingly, for purposes of this disclosure, the term "household" shall be understood to refer to any type of premises. Further, the term "external network" shall refer to any network that extends outside the premises, such as the Internet.) For example, intelligent voice assistant 100 may include a voice module that controls general speech functionality, such as voice recognition and speech generation. Intelligent voice assistant 100 may make use of any techniques in the field of machine learning or artificial intelligence for facilitating verbal communication with a user. In some embodiments, intelligent voice assistant 100 could include software making use of natural language processing to process incoming sounds (such as words), interpret the input, and produce audible responses (such as words). More specifically, intelligent voice assistant 100 could use speech recognition algorithms to process incoming speech, natural language understanding algorithms to determine the content of the speech, and natural language generation algorithms to produce speech that can be understood by a user.

FIG. 1 also shows an intelligent voice assistant privacy regulating system 102. As shown in FIG. 1, system 102 may include a wireless router 103. Wireless router 103 may be configured to provide a wireless network connection for intelligent voice assistant 100, for example, via Wi-Fi service. Further, wireless router 103 may transmit data to and from intelligent voice assistant 100, thus providing a gateway for communication between intelligent voice assistant 100 and an external network outside the household, such as the Internet 104.

In some embodiments, a controller 105 of system 102 may be configured to regulate the transmission of data from intelligent voice assistant 100 to Internet 104. As shown in FIG. 1, in some embodiments, controller 105 of system 102 may be integrally formed as part of the same device as wireless router 103. In addition, controller 105 may include various computing and communications hardware, such as servers, integrated circuits, displays, etc. Further, controller 105 may include a device processor 110 and a non-transitory computer readable medium 115 including instructions executable by device processor 110 to perform the processes discussed herein. In some embodiments, the same controller utilized to regulate the transmission of data received from intelligent voice assistant 100 may be that which operates other functions of wireless router 103 generally.

The non-transitory computer readable medium may include any suitable computer readable medium, such as a memory, e.g., RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, a read-only memory (ROM), a random access memory (RAM), a static random access memory (SRAM), a portable compact disc read-only memory (CD-ROM), an erasable programmable read-only memory (EPROM or Flash memory), a digital versatile disk (DVD), a memory stick, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

Controller 105 may include networking hardware configured to interface with other nodes of a network, such as a LAN, WLAN, or other networks. In Further, controller 105 may be configured to receive data from a plurality of sources and communicate information to one or more external destinations. Accordingly, controller 105 may include a receiver 120 and a transmitter 125. (It will be appreciated that, in some embodiments, the receiver and transmitter may be combined in a transceiver.)

Any suitable communication platforms and/or protocols may be utilized for communication between controller 105 and other components of the system. Since the various sources of information may each have their own platform and/or protocol, system 102 may be configured to interface with each platform and/or protocol to receive the data. For example, the embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

In some embodiments, the wireless router device 103 may include a microphone 130 that is configured to detect speech for purposes of evaluating whether the speech is of the type whose transmission is to be restricted. If microphone 103 detects speech that is to be restricted, the same speech recorded by and received from intelligent assistant 100 will be prevented from transmitting outside household 101. In some embodiments, the speech recorded by intelligent voice assistant 100 itself may be used to make this evaluation. In some embodiments, the microphone that records speech for purposes of evaluation may be incorporated into a device other than intelligent voice assistant 100 and wireless router 103. This may be beneficial for household network configurations where wireless router 103 is not located in close proximity to intelligent voice assistant 100.

The method of using system 100 may include receiving a selection from a user as to one or more privacy settings limiting the transmission of data from an intelligent voice assistant, regulating transmissions from the intelligent voice assistant based on the selection; and selectively transmitting data from the intelligent voice assistant. A dashed line 135 indicates a condition where external transmission of data received from intelligent voice assistant 100 is permitted. A dashed line 140 with an "X" through it indicates a condition where external transmission of data received from intelligent voice assistant 100 is not permitted.

Figure 2:
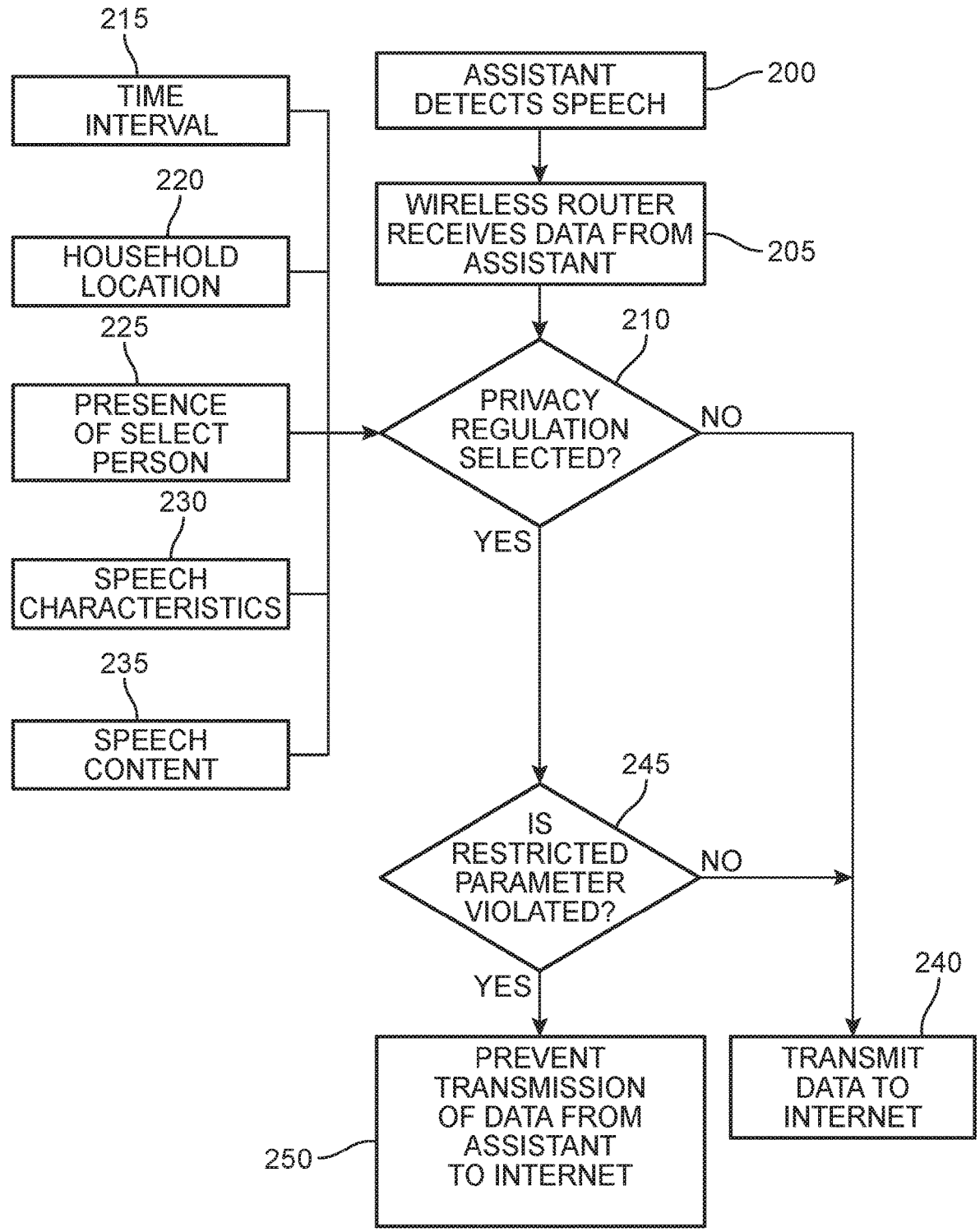
FIG. 2 is a flowchart illustrating steps in a method of using the system of FIG. 1.

FIG. 2 is a flowchart illustrating steps in a method of using the system of FIG. 1. At step 200, the intelligent voice assistant detects some kind of speech from within the household. At step 205, data associated with the detected speech may be received by a wireless router from the intelligent voice assistant.

Next, at step 210, the system may check to see whether a type of privacy regulation has been selected. Examples of such privacy regulation parameters are shown in FIG. 2. For example, at step 215, a time interval restriction may be selectable. This may permit the user to restrict the transmission of data received from the intelligent voice assistant to certain time intervals. Such a setting may permit the user to select time intervals when data will be transmitted and/or time intervals where data will not be transmitted.

At step 220, the placement of the intelligent voice assistant within the household may be used as a restriction to transmission of data. For example, the user may select the rooms in the household within which received data may be transferred. For instance, the user may set the system to transmit data collected from the kitchen, but not transfer data collected from the bedroom or the office within the household.

At step 225, the presence of select persons may be utilized to restrict data transmission. For example, the system may be set to transmit data only when certain individuals are present and/or when certain individuals are not present. The presence of individuals may be monitored using any suitable technique. For example, in some embodiment, the presence of individuals may be determined based on voice signature. In some embodiment, the presence of individuals may be determined based on detection of one or more wearables or personal electronic devices associated with the individual whose presence is being monitored.

At step 230, the characteristics of speech may be utilized to restrict data transmission. For example, the system may be set to prevent transmission of certain kinds of speech, such as arguments, angry exclamations, sorrowful speech, stressed speech, etc.

At step 235, the content of the speech may be utilized to restrict data transmission. For example, sensitive topics of speech, such as financial discussions, marital discussions, healthcare discussions, etc. may be prevented from being transmitted outside the household.

Other parameters such as these may be considered for restricting transmission of speech data. In addition, one or more of the parameters considered may be analyzed by artificial intelligence and/or machine learning.

If, at step 210, it is determined that no privacy restrictions have been selected, then the data received from the intelligent assistant may be transmitted outside the household, such as to the Internet, as shown in step 240. If, however, it is determined, at step 210, that a privacy restriction has been selected, then the process may proceed to step 245, at which the system evaluates whether the selected restriction parameter has been violated. If not, then the process proceeds to step 240 at which the data received from the intelligent voice assistant is transmitted out of the household. If the parameter is determined to have been violated at step 245, then transmission of the at least some of the data received from the intelligent voice assistant is prevented at step 250.

In some embodiments, the software that regulates the transmission of data from the intelligent voice assistant may be stored on a device other than the wireless router. For example, in some embodiments of the system, the software may be stored on a personal electronic device, such as a smart phone, laptop, tablet, etc.

Figure 3:
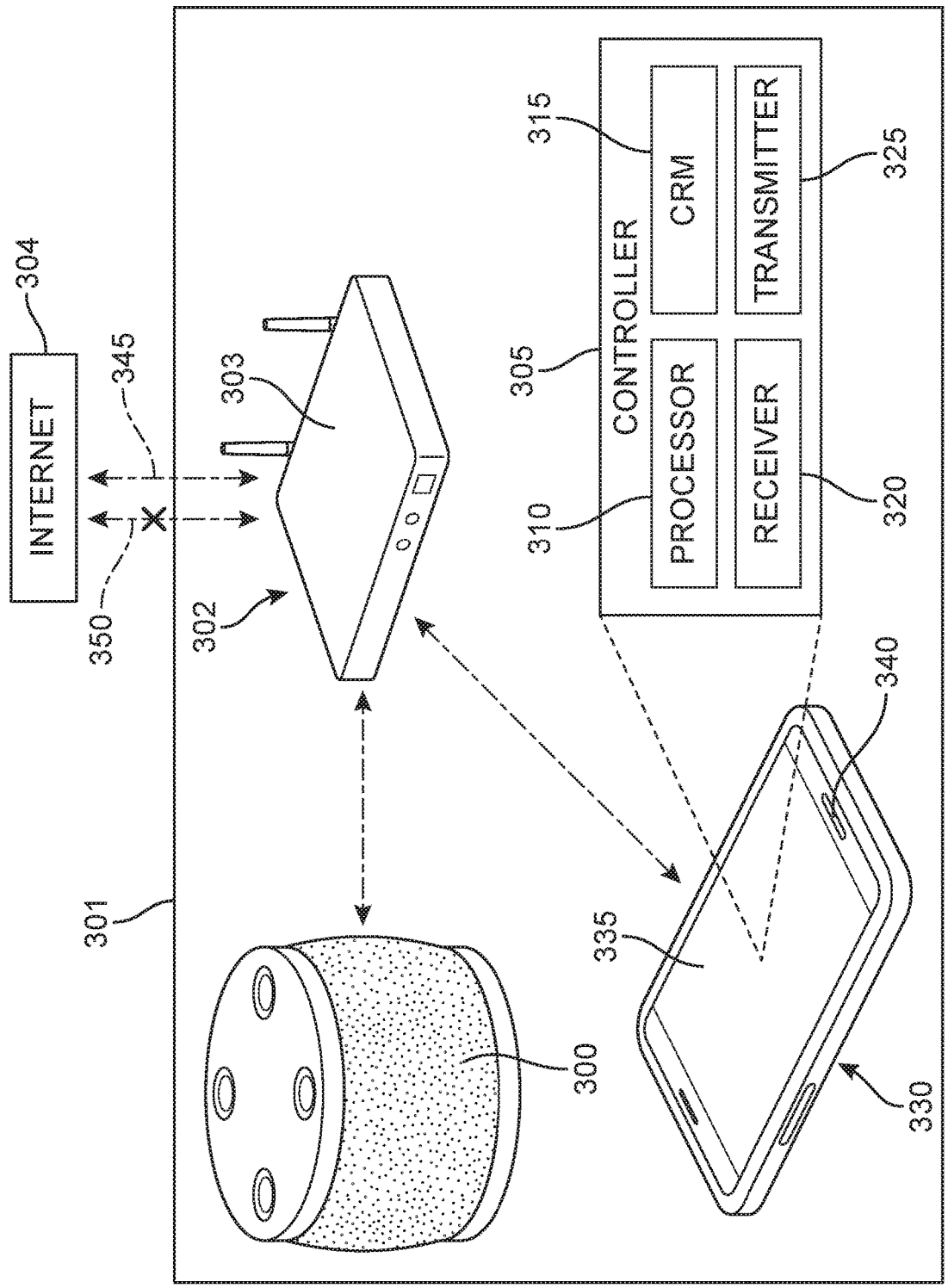
FIG. 3 is a schematic view of an intelligent voice assistant privacy regulating system according to another exemplary embodiment.

FIG. 3 is a schematic view of an intelligent voice assistant privacy regulating system according to another exemplary embodiment. As shown in FIG. 3, an intelligent voice assistant 300 may be configured to send data to a wireless router 303, which may be a component of system 302. In some embodiments, system 302 may merely include the personal electronic device, such as a smart phone 330. It will be understood that the personal electronic device could alternatively be any suitable device, such as a laptop, tablet, smart watch, etc.

Smart phone 330 may include a graphical user interface 335 and a microphone 340. Interface 335 may be configured for permitting the user to interact with an application (app) from which data transmission settings may be selected. Smart phone 330 also has a microphone 340, which may be used to detect speech for consideration in evaluating whether certain privacy settings have been violated.

In addition, smart phone 330 may include a controller 305 configured to process the privacy evaluations and control whether wireless router 303 transmits data. Controller 305 may include various computing and communications hardware, such as servers, integrated circuits, displays, etc. Further, controller 305 may include a device processor 310 and a non-transitory computer readable medium 315 including instructions executable by device processor 310 to perform the processes discussed herein. Computer readable medium 315 may have the same or similar characteristics as described above with respect to computer readable medium 115.

Controller 305 may include networking hardware configured to interface with other nodes of a network, such as a LAN, WLAN, or other networks. In Further, controller 305 may be configured to receive data from a plurality of sources and communicate information to one or more external destinations. Accordingly, controller 305 may include a receiver 320 and a transmitter 325. (It will be appreciated that, in some embodiments, the receiver and transmitter may be combined in a transceiver.) The computing and communications protocols utilized by controller 305 may be the same or similar as discussed above with respect to controller 105.

System 302 may be configured to permit the user to select the same, or substantially the same, privacy settings in terms of what data is to be permitted to be transmitted out of the household from intelligent assistant 300, and what data will be prevented from being transmitted. A dashed line 345 indicates a condition where external transmission of data received from intelligent voice assistant 300 is permitted. A dashed line 350 with an "X" through it indicates a condition where external transmission of data received from intelligent voice assistant 300 is not permitted.

A method of utilizing system 302 will now be discussed. As with system 102 discussed above, the method may include receiving a selection from a user as to one or more privacy settings limiting the transmission of data from an intelligent voice assistant; and regulating transmissions from the intelligent voice assistant based on the selection. In the case of system 302, however, controller 305 is provided in a separate device (e.g., smart phone 330) from wireless router 303 configured to transmit data from intelligent voice assistant 300, and is configured to provide instructions to wireless router 303 to regulate transmission of data from intelligent voice assistant 300.

Figure 4:
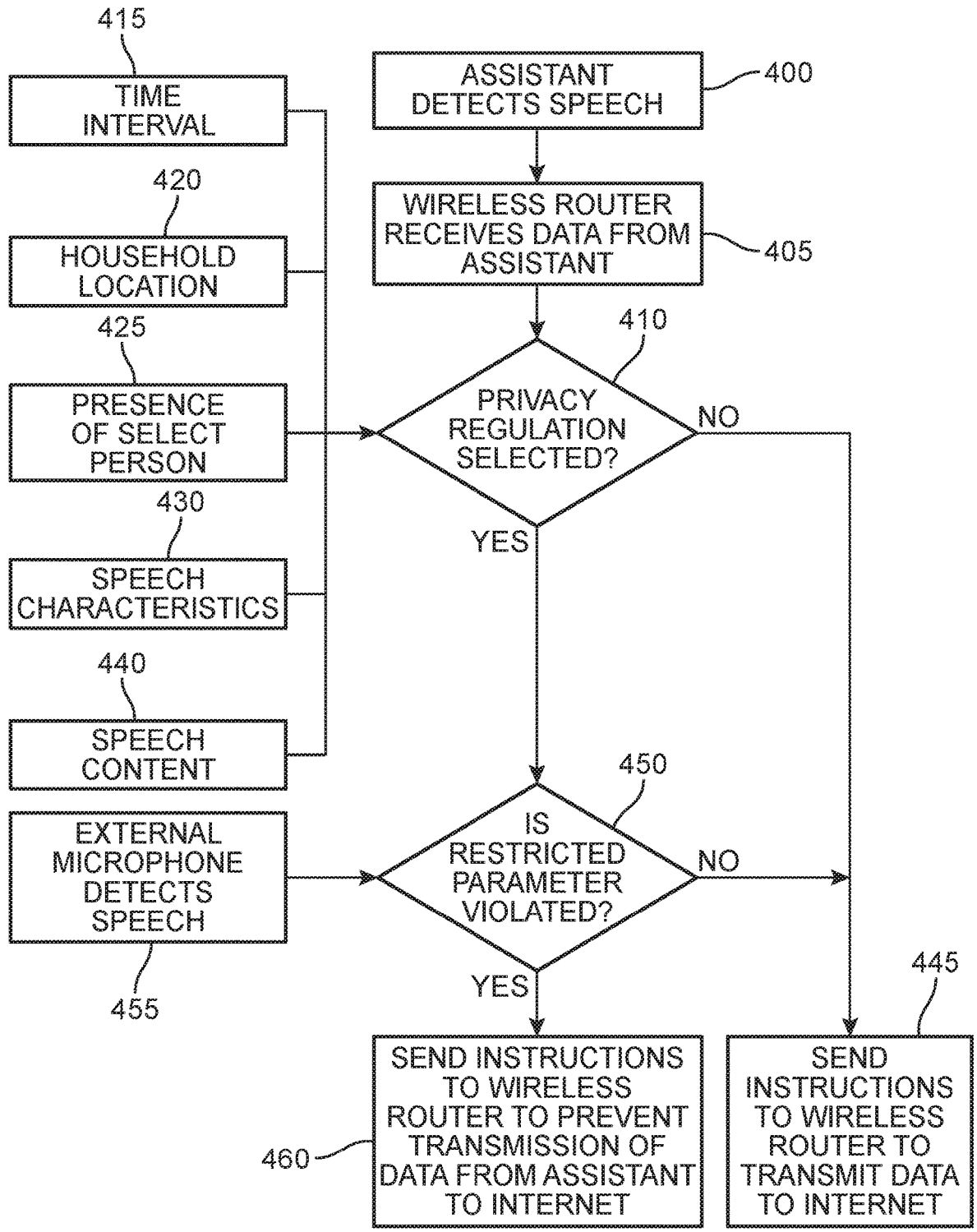
FIG. 4 is a flowchart illustrating steps in a method of using the system of FIG. 3.

FIG. 4 is a flowchart illustrating steps in a method of using the system of FIG. 3. At step 400, the intelligent voice assistant detects some kind of speech. At step 405, the wireless router receives data from the assistant related to the detected speech.

At step 410, the system determines whether a privacy regulation has been selected by the user. As with the method discussed with respect to FIG. 2, any of a variety of different privacy regulations may be selected. For example, such privacy regulations may include selecting a predetermined time interval during which data may or may not be transmitted (step 415); selecting one or more household locations from which data may or may not be transmitted (step 420); selecting a particular person whose presence is either required for transmission or prohibited for transmission (step 425); selecting one or more speech characteristics to determine whether transmission of speech having such characteristics will be executed (step 430); and selecting particular types of speech content that may or may not be permitted to be transmitted (step 440).

If, at step 410, the system determines that no privacy regulation has been selected, then the method proceeds to step 445 at which the personal electronic device sends instructions to the wireless router to transmit whatever data it is receiving from the intelligent voice assistant to the internet without restriction. If, at step 410, a privacy regulation is determined to have been selected, the method proceeds to step 450 to determine whether any restricted parameters have been violated. For consideration of speech based restrictions, at step 455, input is received from an external microphone (which may be incorporated into the user's personal electronic device as discussed above).

If, at step 450, no restricted parameter is determined to have been violated, then the method proceeds to step 445 at which data is transmitted without restriction. If, at step 450, one or more restricted parameters have been determined to have been violated, then the method proceeds to step 460 at which the personal electronic device sends instructions to the wireless router to prevent transmission of data from the intelligent voice assistant to the internet.

The embodiments discussed herein may make use of methods and systems in artificial intelligence to improve efficiency and effectiveness of the disclosed systems. As used herein, "artificial intelligence" may include any known methods in machine learning and related fields. As examples, artificial intelligence may include systems and methods used in deep learning, machine vision, and natural language processing (NLP).

For each of the exemplary processes described above including multiple steps, it may be understood that other embodiments some steps may be omitted and/or reordered. In some other embodiments, additional steps could also be possible.

While various embodiments have been described, the description is intended to be exemplary, rather than limiting, and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with, or substituted for, any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

We claim:

1. An intelligent voice assistant privacy regulating system, comprising:
    a controller including a device processor and a non-transitory computer readable medium including instructions executable by the device processor to perform the following steps:
    receiving a selection from a user as to one or more privacy settings limiting transmission of data from an intelligent voice assistant to the Internet based on one or more privacy parameters; and
    regulating transmissions by selectively preventing transmission of certain data from the intelligent voice assistant to the Internet based on the selection;
    wherein the controller is provided in a separate device from a wireless router configured to transmit data from the intelligent voice assistant, and is configured to provide instructions to the wireless router to regulate transmission of data from the intelligent voice assistant to the Internet;
    wherein at least one of the selectable privacy settings regulates transmissions from the intelligent voice assistant based on at least one of the following:
    one or more time intervals;
    a location of the intelligent voice assistant within a household;
    the presence of certain persons;
    characteristics of detected speech; and
    the content of detected speech.

2. The system of claim 1, wherein at least one of the selectable privacy settings regulates transmissions from the intelligent voice assistant based on one or more time intervals, such that the user may select time intervals when data will be transmitted.

3. The system of claim 1, wherein at least one of the selectable privacy settings regulates transmissions from the intelligent voice assistant based on a location of the intelligent voice assistant within a household, such that the user may set the system to transmit data collected from certain rooms of the household but not from other rooms of the household.

4. The system of claim 1, wherein at least one of the selectable privacy settings regulates transmissions from the intelligent voice assistant based on one or more time intervals, such that the user may select time intervals when data will not be transmitted.

5. The system of claim 1, wherein at least one of the selectable privacy settings regulates transmissions from the intelligent voice assistant based on the presence of certain persons; and
wherein the presence of certain persons is detected based on voice signature.

6. The system of claim 1, wherein at least one of the selectable privacy settings regulates transmissions from the intelligent voice assistant based on the presence of certain persons; and
wherein the presence of certain persons is detected based on the presence of one or more wearable devices.

7. The system of claim 1, wherein at least one of the selectable privacy settings regulates transmissions from the intelligent voice assistant based on characteristics of detected speech; and
wherein the system is configured to prevent the transmission of certain kinds of speech, including at least one of the following:
arguments;
angry exclamations;
sorrowful speech; and
stressed speech.

8. The system of claim 1, wherein at least one of the selectable privacy settings regulates transmissions from the intelligent voice assistant based on the content of detected speech; and
wherein the system is configured to prevent the transmission of sensitive topics of speech, including at least one of the following:
financial discussions;
marital discussions; and
healthcare discussions.

9. An intelligent voice assistant privacy regulating system, comprising:
a controller including a device processor and a non-transitory computer readable medium including instructions executable by the device processor to perform the following steps:
receiving a selection from a user as to one or more privacy settings limiting transmission of data from an intelligent voice assistant to the Internet;
regulating transmissions by selectively preventing transmission of certain data from the intelligent voice assistant to the Internet based on the selection; and
selectively transmitting data from the intelligent voice assistant to the Internet;
wherein the controller is integrated into the same device as a wireless router configured to transmit data from the intelligent voice assistant; and
wherein the controller is configured to provide instructions to the wireless router to regulate transmission of data from the intelligent voice assistant; and
wherein at least one of the selectable privacy settings regulates transmissions from the intelligent voice assistant based on at least one of the following:
one or more time intervals;
a location of the intelligent voice assistant within a household;
the presence of certain persons;
characteristics of detected speech; and
the content of detected speech.

10. The system of claim 9, wherein at least one of the selectable privacy settings regulates transmissions from the intelligent voice assistant based on one or more time intervals, such that the user may select time intervals when data will be transmitted.

11. The system of claim 9, wherein at least one of the selectable privacy settings regulates transmissions from the intelligent voice assistant based on a location of the intelligent voice assistant within a household, such that the user may set the system to transmit data collected from certain rooms of the household but not from other rooms of the household.

12. The system of claim 9, wherein at least one of the selectable privacy settings regulates transmissions from the intelligent voice assistant based on one or more time intervals, such that the user may select time intervals when data will not be transmitted.

13. The system of claim 9, wherein at least one of the selectable privacy settings regulates transmissions from the intelligent voice assistant based on the presence of certain persons; and
wherein the presence of certain persons is detected based on voice signature.

14. The system of claim 9, wherein at least one of the selectable privacy settings regulates transmissions from the intelligent voice assistant based on the presence of certain persons; and
wherein the presence of certain persons is detected based on the presence of one or more wearable devices.

15. The system of claim 9, wherein at least one of the selectable privacy settings regulates transmissions from the intelligent voice assistant based on characteristics of detected speech; and
wherein the system is configured to prevent the transmission of certain kinds of speech, including at least one of the following:
arguments;
angry exclamations;
sorrowful speech; and
stressed speech.

16. The system of claim 9, wherein at least one of the selectable privacy settings regulates transmissions from the intelligent voice assistant based on the content of detected speech; and
wherein the system is configured to prevent the transmission of sensitive topics of speech, including at least one of the following:
financial discussions;
marital discussions; and
healthcare discussions.

17. A method of regulating privacy of an intelligent voice assistant, comprising:
using a device processor to execute instructions stored on a non-transitory computer readable medium to perform the following steps:
receiving a selection from a user as to one or more privacy settings limiting transmission of data from an intelligent voice assistant to the Internet; and
regulating transmissions by selectively preventing transmission of certain data from the intelligent voice assistant to the Internet based on the selection;

wherein the device processor and computer readable medium are provided in a separate device from a wireless router configured to transmit data from the intelligent voice assistant, and are configured to provide instructions to the wireless router to regulate transmission of data from the intelligent voice assistant; and wherein at least one of the selectable privacy settings regulates transmissions from the intelligent voice assistant based on at least one of the following:

one or more time intervals;

a location of the intelligent voice assistant within a household;

the presence of certain persons;

characteristics of detected speech; and the content of detected speech.

\* \* \* \* \*